United States Patent [19]

Woodard

[11] 4,095,840
[45] Jun. 20, 1978

[54] RETRACTABLE COVER FOR A TRUCK BODY

[76] Inventor: Boyd Ray Woodard, 6995 NW. 32 Ave., Miami, Fla. 33147

[21] Appl. No.: 759,865

[22] Filed: Jan. 17, 1977

[51] Int. Cl. .............................................. B60j 11/00
[52] U.S. Cl. .................................................. 296/100
[58] Field of Search ................................. 296/100, 98

[56] References Cited

U.S. PATENT DOCUMENTS

| 3,168,345 | 2/1965 | Roberts et al. | 296/100 |
| 3,498,666 | 3/1970 | Harrawood | 296/98 |
| 3,656,802 | 4/1972 | White | 296/100 |
| 3,868,142 | 2/1975 | Bachand et al. | 296/100 |

*Primary Examiner*—Robert R. Song

[57] ABSTRACT

A retractable cover, including a pair of side, downwardly extending skirt portions, which is movable, either automatically or manually, from a covering relation to the open top of the load-carrying body of a truck to an open position. The side skirt portions normally overlap a substantial height of the top side edges of the body in the covering position whereby hump loads can be accommodated in the body without exposing the side edges of the load to the normal wind forces and air currents created by the movement of the truck. The margin of the side skirt portions each have elastic cords to provide tension to hold the margins to the truck body. A spring-loaded U-shaped frame, pivoted at its lower end, is utilized to move the cover between its open and closed positions.

5 Claims, 5 Drawing Figures

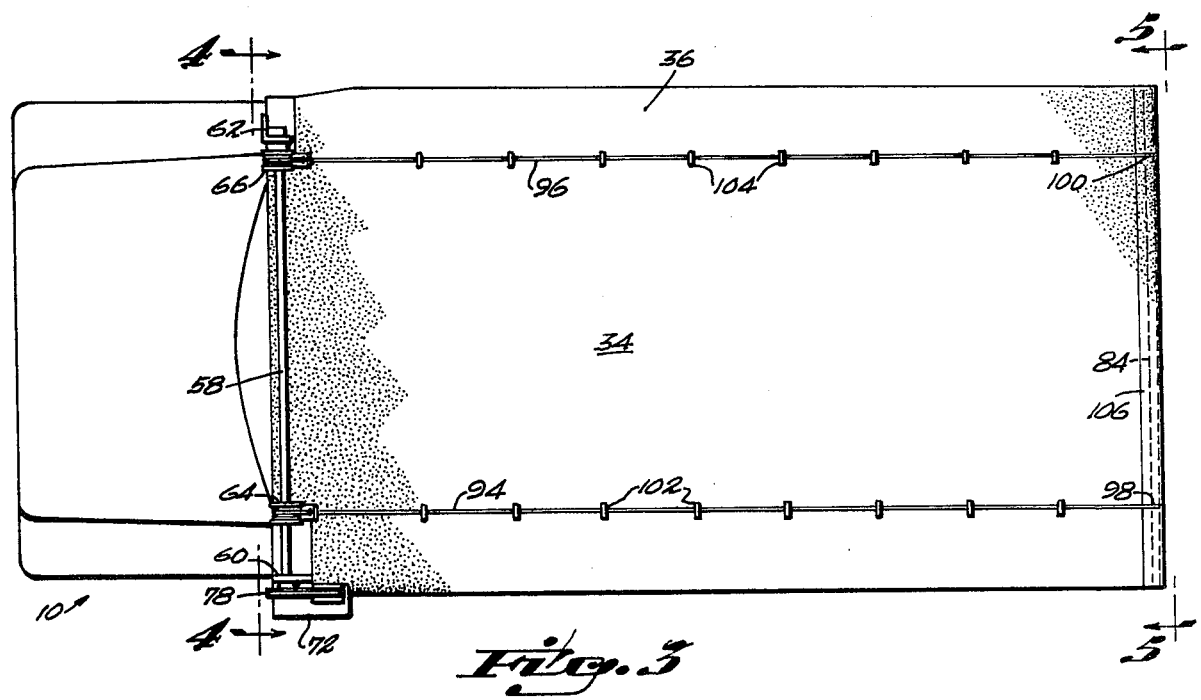
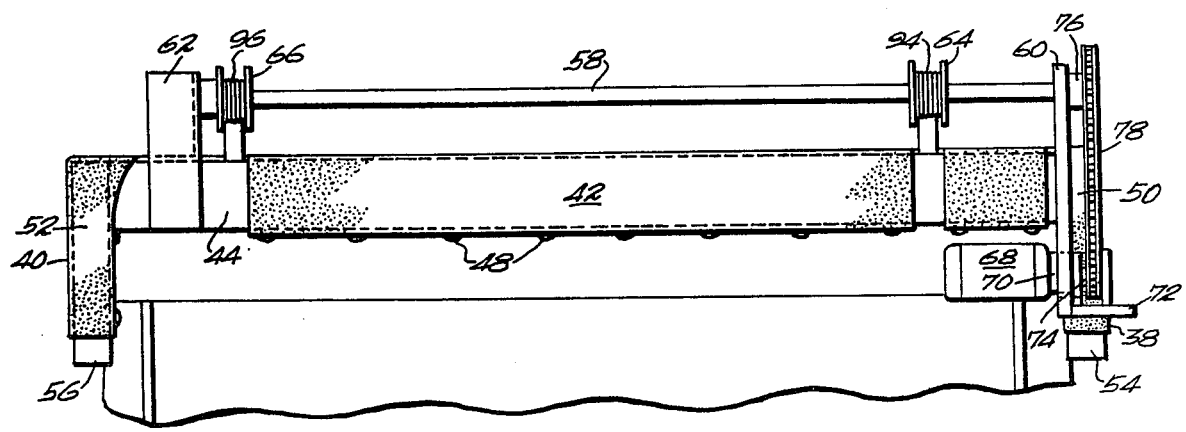
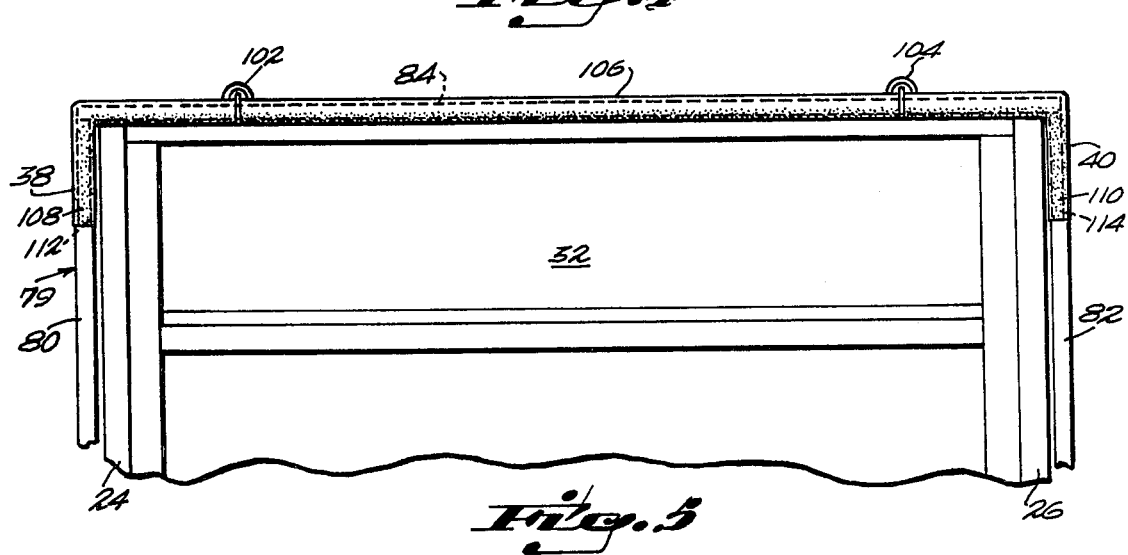

RETRACTABLE COVER FOR A TRUCK BODY

BACKGROUND OF THE PRESENT INVENTION

The present invention relates to devices used for moving a flexible covering between an open and a covering relation to the open top of the load-carrying body of a truck. The necessity for covers of this nature has resulted from local and state regulations which require open top trucks which haul materials such as sand, gravel, land fill, etc. to cover the loads. Loads of this nature have constituted a hazard to following automobiles and motorcyclists due to the fact that the air currents created by rapid movements of the trucks generally result in such materials flying into the following traffic, sometimes resulting in damages such as broken windshields.

Various types of cover mechanisms have been developed and patented. However, the widths of most of the covers approximate the widths of the open tops of the dump trucks and as most trucks generally are loaded to their maximum capacity for economic reasons, the resulting hump loads generally draw the covers upwardly, exposing the side edges of the loaded materials. Attempts at solving this problem have resulted in a plurality of the tie-down lines or ropes, fixed in a spaced relation along the two side edges of the cover. The free ends of the tie downs are normally tied to projections along the sides of the truck body.

A majority of the truck body covers of this nature, now in use, are convolutely wound on a roller over the cab protector when in a retracted condition. As a result, the covers are transversely sized to the roller widths which are generally sized to the width of the truck body.

OBJECTS AND ADVANTAGES OF THE PRESENT INVENTION

One of the principal objects of the present invention is to provide a retractable cover for the open top of the load-carrying body of a truck, which when used to cover a load remains in its intended position.

Another principal object of this invention is to provide a truck body cover of this nature which includes opposed side skirt portions which overlie a substantial height of the top side edges of the load-carrying body when said cover is in its extended position and remain in place in use.

A further object of the instant invention is to provide an improved retractable truck body cover which is movable between an extended position in covering relation to the open top of the load-carrying body of a truck and a retracted position wherein said cover is stacked in accordion fashion over the cab protector forwardly of the open top.

Yet another object of the present invention is to provide an improved truck cover device of the type which includes a generally U-shaped frame, pivotally attached at the lower ends of the two leg portions thereof to the respective sides of the truck body and to the rear end of the flexible cover along the length of the transverse base member thereof. Downward projections are provided at the respective ends of the transverse base member to anchor the rear ends of the side skirt portions of the cover.

A still further object of this invention is to provide an improved device of the type described which includes drive means, pulley means and connection means, such as ropes or the like, between said pulley means and the base member of the U-shaped frame to retract the cover from its extended position.

A further object of the present invention is to provide spring means connecting between said U-shaped frame and the truck body to move the frame and cover from its retracted position to its extended position and which includes an improved cover.

BRIEF DESCRIPTION OF THE DRAWINGS

FIG. 3 is a top plan view of the truck and associated cover mechanism as seen in FIG. 1;

FIG. 4 is a front elevational view of the drive and pulley means of the cover mechanism as seen along the line 4—4 of FIG. 3; and FIG. 5 is a rear elevational view of the truck as seen in FIG. 1.

DETAILED DESCRIPTION OF THE DRAWINGS

Figure 1:
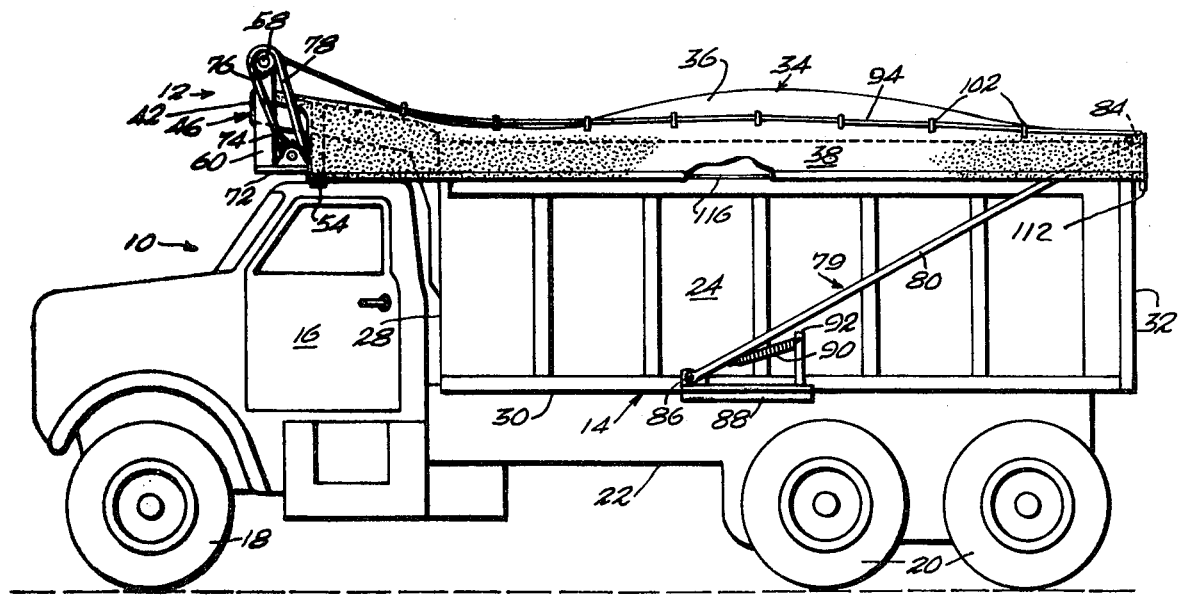
FIG. 1 is a side elevational view of a typical dump truck provided with the retractable cover mechanism of the present invention, the cover being in an extended position.
Figure 2:
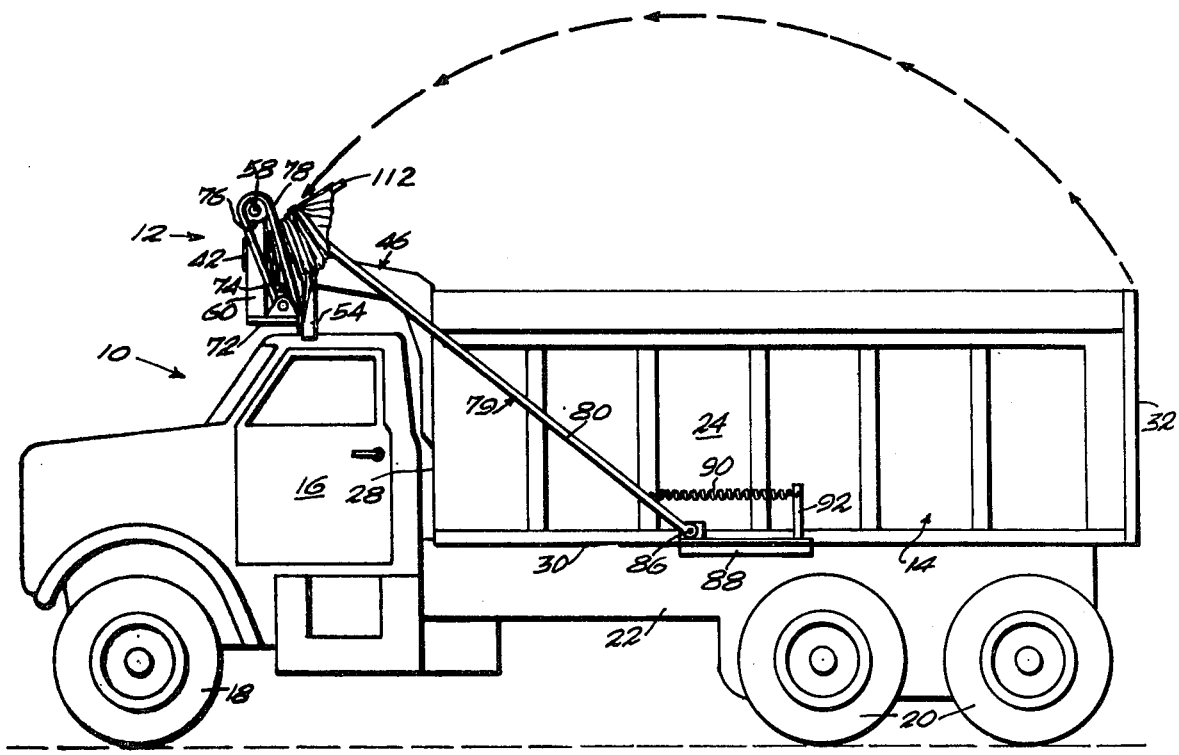
FIG. 2 is a side elevational view similar to FIG. 1 with the cover in a retracted position.

With reference to the drawings in which like reference numerals designate like or corresponding parts throughout the various views and with particular reference to FIGS. 1 and 2 a typical dump truck 10 is illustrated which is provided with a retractable cover mechanism 12 for the open top of the load-carrying body 14 thereof. The truck includes a cab portion 16, front and rear wheel assemblies 18 and 20 and a chassis 22. As illustrated, the load-carrying body 14 is comprised of a pair of opposed side walls 24 and 26, a front wall 28, bottom wall 30 and a tailgate 32 which is pivoted at the top for free swinging movement to an open position for dumping purposes. It should be understood that the retractable cover mechanism 12 of the present invention is applicable to trucks other than dump trucks. However, the dump truck is illustrated because it is generally trucks of this type which haul loads which require covering.

The cover mechanism 12 includes a flexible cover 34 having a top portion 36, a pair of opposed side skirt portions 38 and 40 and a front portion 42 which wraps downwardly and under the front wall 44 of a platform or cab protector extension 46 of the body 24. Any type of fastening means, illustrated at 48, FIG. 4, may be used to hold the front portion of the cover 42 to the front wall 44. In like manner, the front ends 50 and 52 of the skirt portions 38 and 40 are wrapped around and fastened to vertical downwardly extending members 54 and 56, fixed as by welding to the cab protector 46. In this manner, the entire front portion of the cover 34 is sealed against the wind and air currents during operation of the truck.

A transverse shaft 58 is rotatably journaled in a pair of opposed side brackets 60 and 62, fixed to and extending vertically upwardly from the cab protector 46. A pair of pulley members 64 and 66 are fixed to the shaft 58 in a spaced apart relation. As best seen in FIG. 4, a reversible motor 68 and gear reduction box 70 are carried by a platform 72 fixed to the lower end of the bracket 60. The motor 68 is drivingly connected to the transverse shaft 58 as by sprockets 74 and 76 and chain 78.

Referring to FIGS. 1, 2 and 5 a generally U-shaped frame 79 comprised of a pair of parallel side legs 80 and 82 and a transverse cross rod 84 connecting between the upper ends thereof, is pivotally connected as at 86 at the lower ends of said legs 80 and 82 to brackets 88 (one side shown) fixed to the load-carrying body 24 intermediate the front and rear ends of each side of said body 14, adjacent the bottom edges thereof. A tension spring 90 is connected between each of the legs 80 and 82 and an arm 92 fixed to and extending vertically upwardly from the rear end of each bracket 88. The U-shaped frame is, therefore, normally urged to the position illustrated in FIG. 1.

A pair of flexible cables 94 and 96 fixed at their forward ends to the respective pulleys 64 and 66 extend rearwardly to points of attachment 98 and 100 to the cross rod 84. The flexible cables 94 and 96 pass through pluralities of aligned guide eye brackets 102 and 104 fixed to the top 36 of the flexible cover 34.

As best illustrated in FIGS. 1 and 5, the rear end of the cover top 36 is fixed as at 106 to the cross rod 84 and the rear ends of the skirt portions 38 and 40 are fixed as at 108 and 110 to downward projections 112 and 114 fixed to the respective ends of said cross rod 84. In this manner, the normal dumping operation of the truck can be accomplished without retracting the cover.

The electric controls for the reversible motor 68 may be located on the motor in a position to be operated by the truck driver without leaving the cab, or they may be remotely located within the cab. An auxiliary crank may be provided for use in event of motor failure or as the lone operating means.

In operation, the operator actuates the motor 68 in a first direction permittng the cables 94 and 96 to unwind from the pulleys 64 and 66 whereupon the U-shaped frame 79 under forces created by the tension springs 90 pivots the frame 79 and cover 34 to the covered position of FIG. 1. When the motor 68 is reversed, the cables 94 and 96 are rewound onto the pulleys 64 and 66 causing the U-shaped frame 79 to pivot forwardly, gathering the cover in accordion fashion over and beside the cab protector 46 as seen in FIG. 2. As seen fragmentarily in FIG. 1, flexible ropes, cables or the like 116 are hemmed into the bottom edges of the skirt portions 38 and 40 to tension same when the cover is in the extended position.

It will be seen that by reason of the foregoing structure, the elastic cords which are provided in the side hems serve the following purposes: When the cover is in the process of being extended into covering relation of the body, the elastic cords are gradually being drawn taut. Because the cords are in a depending or lower position relative to the tops of the side of the truck, the lower edge of the cover is forced to overlay the outside surfaces of the truck. As a result the operator does not have to climb onto the truck to do this. Also, when it is extended into a covered position, the cords, being stretched out hold the cover against forces blowing from side to side or, indeed, up and down. Further, the cords help to make the cover store in a somewhat smaller package on top of the truck, see for example FIG. 2. Finally, in those situations when it is desirable to tie down the marginal edge of the cover, any depending ties, not shown, along the marginal edge of the cover will fall on the outside of the truck body so that they can be reached and an operator will not have to climb up on the truck, reach over into the truck and pull the tie out and then tie it.

What is claimed is:

1. A retractable, flexible cover for the open top of the load-carrying body of a truck providing a forwardly projecting platform from the forward top end thereof comprising:
   A. a generally U-shaped support frame including,
      1. a pair of parallel side legs, pivotally connected at their lower ends to the respective side walls of the load-carrying body, intermediate the forward and rear ends thereof, and
      2. a transverse cross rod fixed between the upper ends of said legs;
   B. a cover including,
      1. a main body portion sized to cover the open top with the rear end thereof fixed to said cross rod and the forward end thereof fixed relative to the front end of the forwardly projecting platform, and
      2. a pair of side skirt portions, adapted to cover a substantial heighth of the top edge portion of the respective side walls of the body and said skirt portions terminating at a marginal edge;
   C. means to anchor the forward and rear ends of the respective skirt portions;
   D. tension spring means normally urging said U-shaped frame to a rearward position;
   E. reversible drive means fixed relative to the platform;
   F. connection means from said drive means to said cross rod to permit said cover to be extended to a covering relation to the open top with said skirt portions in an overlapping relation to said top edge portions when said reversible drive means is actuated in a first direction, and to be retracted to a gathered, accordion type of condition over and alongside of said platform when said reversible drive means is actuated in a second direction; (and)
   G. elastic tensioning means secured along the margins of said skirt portions to normally apply tension forces and yieldable to be stretched over a load; and
   H. said means to anchor comprising a pair of vertical members fixed relative to the platform and a pair of projections fixed relative to the opposed ends of said transverse cross rod.

2. The cover as defined in claim 1 wherein said tension spring means comprises a tension spring fixed at its first end relative to the lower pivot end of each of said parallel side legs and at its second end to a member, fixed relative to the load-carrying body rearwardly of each of said legs.

3. The cover as defined in claim 1 wherein said reversible drive means comprises a reversible motor, mounted relative to the forwardly projecting platform.

4. The cover as defined in claim 3 wherein said connection means comprises a transverse shaft, rotatably mounted across the top of said platform in driving connection with said reversible motor, a plurality of pulleys, fixed to said transverse shaft and a flexible cable connected between each of said pulleys and said transverse cross rod.

5. The cover as defined in claim 4 including a plurality of guide eyes fixed in a spaced apart, aligned disposition between each of said pulleys and said transverse cross rod, said flexible cables being threaded therethrough.

* * * * *